US007505363B2

(12) United States Patent
Jeffers

(10) Patent No.: US 7,505,363 B2
(45) Date of Patent: Mar. 17, 2009

(54) AUTOMATIC SWITCH FOR MARINE SOUNDERS

(75) Inventor: Robert K. Jeffers, Wilton, NH (US)

(73) Assignee: Airmar Technology Corporation, Milford, NH (US)

( * ) Notice: Subject to any disclaimer, the term of this patent is extended or adjusted under 35 U.S.C. 154(b) by 137 days.

(21) Appl. No.: 11/279,179

(22) Filed: Apr. 10, 2006

(65) Prior Publication Data

US 2007/0237028 A1 Oct. 11, 2007

(51) Int. Cl.
*G01S 15/87* (2006.01)
(52) U.S. Cl. .......................................... 367/99; 367/903
(58) Field of Classification Search .................... 367/99, 367/903, 117, 111
See application file for complete search history.

(56) References Cited

U.S. PATENT DOCUMENTS

| | | | |
|---|---|---|---|
| 3,646,278 A | 2/1972 | Panizzi | |
| 3,648,636 A | 3/1972 | Mentcher et al. | |
| 4,336,605 A | 6/1982 | Vancha | |
| 4,445,206 A | 4/1984 | Audenard | |
| 4,879,697 A | 11/1989 | Lowrance et al. | |
| 4,935,906 A | 6/1990 | Baker et al. | |
| 5,001,678 A | 3/1991 | Fukuoka et al. | |
| 5,184,330 A * | 2/1993 | Adams et al. | 367/111 |
| 5,205,175 A | 4/1993 | Garza et al. | |
| 5,318,027 A | 6/1994 | Fukui | |
| 5,537,380 A | 7/1996 | Sprankle, Jr. et al. | |
| 5,882,310 A | 3/1999 | Marian, Jr. | |
| 6,160,756 A | 12/2000 | Guignée | |
| 6,198,692 B1 | 3/2001 | Sekine | |
| 6,445,646 B1 | 9/2002 | Handa et al. | |
| 6,629,928 B1 | 10/2003 | Dolan et al. | |
| 6,738,311 B1 | 5/2004 | Guigné | |
| 6,773,401 B1 | 8/2004 | Dreschel et al. | |
| 2004/0037166 A1 | 2/2004 | Handa et al. | |
| 2004/0051681 A1* | 3/2004 | Kitayama | 345/9 |
| 2004/0205821 A1* | 10/2004 | Yamada et al. | 725/80 |
| 2007/0237028 A1* | 10/2007 | Jeffers | 367/903 |

FOREIGN PATENT DOCUMENTS

| | | | |
|---|---|---|---|
| JP | 58048586 A2 | | 3/1983 |
| JP | 61014510 A2 | | 1/1986 |
| JP | 2004150872 A | * | 5/2004 |

OTHER PUBLICATIONS

"BoatUS.com: Fishfinders", BoatTECH Guides, Oct. 29, 2000, Boat Owners Association of the United States <http://web.archive.org/web/20001029062104/http://www.boatus.com/boattech/ffs.htm>.*

* cited by examiner

*Primary Examiner*—Dan Pihulic
(74) *Attorney, Agent, or Firm*—Hamilton, Brook, Smith & Reynolds, P.C.

(57) ABSTRACT

A switch that couples transducer signal to a specific sounder of multiple sounders in response to a sensed signal from the specific sounder. The switch can include a first detection circuit that determines the sounder that is requesting the first transducer signal and a first control circuit that couples the first transducer signal to the requesting sounder. The switch can further include a second detection circuit that determines the sounder that is requesting the second transducer signal and a second control circuit that couples the second transducer signal to the requesting sounder.

15 Claims, 5 Drawing Sheets

AUTOMATIC SWITCH FOR MARINE SOUNDERS

BACKGROUND

Most marine vessels include at least a single helm station (bridge) for controlling the operation of the vessel. The helm typically includes engine controls and instrumentation, hydraulic or mechanical steering, and navigation devices. The navigation devices can include a compass, global positioning system/plotter, fishfinder/sounder, depth finder or a combination thereof. The fishfinder/sounder device works in combination with a transducer that produces a representative signal of the characteristics of a body of water.

In some instances, for example commercial fishing vessels, the marine vessel may include dual or multiple helm stations (e.g., a bridge and a fly bridge). These dual or multiple helm stations typically include the same or similar instrumentation at each station so the vessel's operator or captain can move between stations without losing functionality.

SUMMARY

In the case of dual or multiple sounders, a single manual switch, typically located at the main helm station (bridge), needs to be engaged before the captain or operator of the marine vessel changes stations. The manual switch allows a signal from an ultrasonic transducer to be switched between sounders such that a visual representation of the body of water can be displayed to the operator at the current helm station. If the manual switch is not engaged before the captain or operator moves between helm stations the sounder will not function without the captain first returning to the helm station that includes the manual switch and engaging the switch to the desired station.

The present invention provides a switch that couples a transducer signal to a specific sounder of multiple sounders in response to a sensed signal from the specific sounder. In one embodiment, the switch can include a detection circuit that determines the sounder that is requesting the transducer signal and a control circuit that couples the transducer signal to the requesting sounder. In another embodiment, the switch can further include a second detection circuit that determines the sounder that is requesting the second transducer signal and a second control circuit that couples the second transducer signal to the requesting sounder.

The detection circuit includes a first pulse detector that detects a pulse from a first sounder and a second pulse detector that detects a pulse from a second sounder. The control circuit includes a processor in communication with the detection circuit that receives a detected pulse from a requesting sounder and a relay circuit controlled by the processor to couple the transducer signal to the requesting sounder. The transducer signal can be a high frequency signal or a low frequency signal. In most instances the first transducer signal is different from the second transducer signal.

The present invention further includes a transducer signal switching system for a marine vessel. The system includes a transducer that produces a signal representative of characteristics of a body of water, at least two sounders for producing a visual representation of the characteristics, and a switch that determines the sounder that requires the signal produced from the transducer and couples the signal to the determined sounder.

The transducer can be an ultrasonic transducer. The transducer can be through-hull mounted or transom mounted to the marine vessel. A first sounder can be located at a main pilot station of the marine vessel and a second sounder located at a different station of the marine vessel.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

A description of preferred embodiments of the invention follows.

Figure 1:
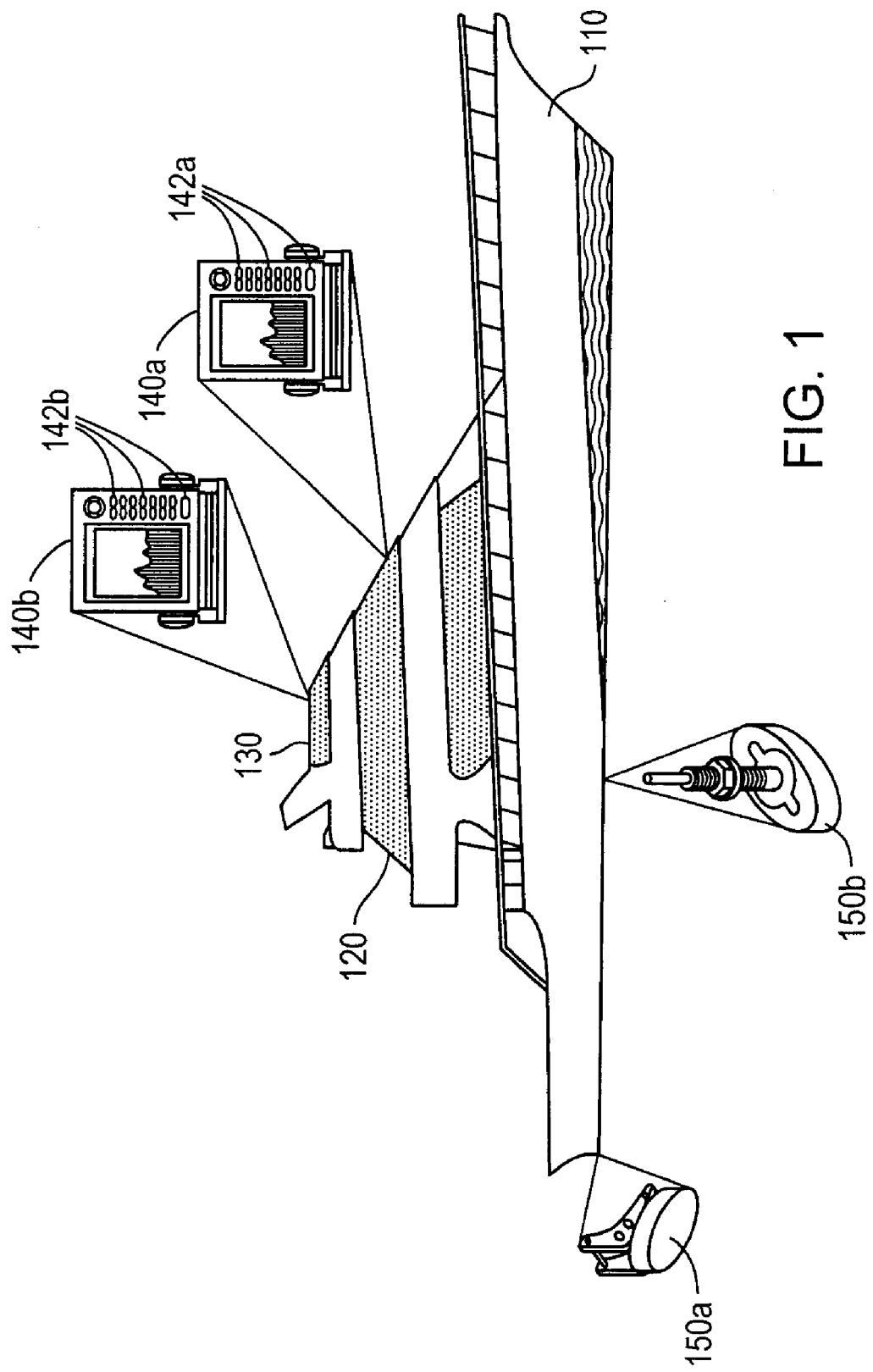
FIG. 1 shows a side view of a dual helm marine vessel.

Generally, the present invention provides a switching system that couples a transducer signal to one sounder of a multiple sounder/fishfinder system of a marine vessel. FIG. 1 shows a side view of a representative dual helm marine vessel 110. The marine vessel 110 has a first piloting station (helm) 120 and a second piloting station or fly bridge 130. The marine vessel 110 includes a sounder 140 located at each piloting station 120, 130 and a transducer 150. The sounder 140 displays a graphical representation of a transducer signal representative of characteristics of a body of water, e.g., depth of objects in relation to the marine vessel 110, and a bottom depth of the body of water. Each sounder includes a plurality of buttons 142 or switches for operating the sounder 140. These buttons 142 may include an on/off button, zoom in/zoom out button, etc. The transducer 150 can be a transom-mounted transducer 150a or a through-hull mounted transducer 150b. In other embodiments, an in-hull transducer may be employed. The transducer 150 can be an ultrasonic transducer and can be operable at single or multiple frequencies. Such transducers 150 are produced by Airmar Technology Corporation of Milford, N.H.

The sounders 140a, 140b can be identical or different models produced by the same company or a combination of different sounders from multiple companies. For example, the sounders 140a, 140b can be a FCV600L model fishfinder or other model fishfinders produced by Furuno® USA, a combination thereof, or any other sounding device(s) or combination thereof known in the industry.

Figure 2A:
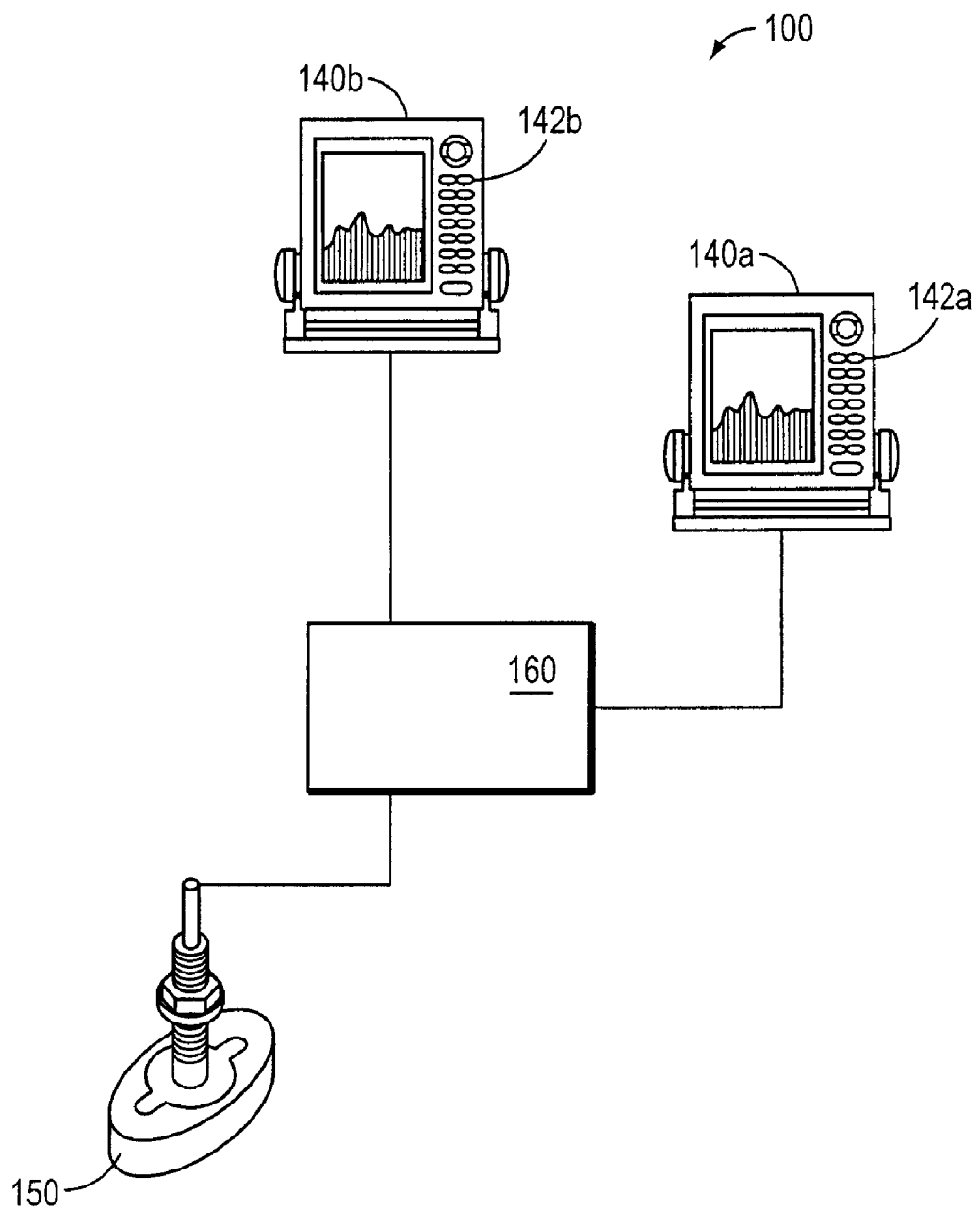
FIG. 2A shows a graphical representation of a switching system of the present invention.

FIG. 2A shows a graphical representation of a switching system 100 of the present invention. Generally, each sounder 140 is in the off position prior to moving between stations (120, 130; FIG. 1). A switch 160 monitors each sounder 140a, 104b to determine if a user is requesting a particular sounder 140 to function. If the switch 160 determines a particular sounder 140 is requesting a signal, the switch 160 couples the transducer signal to the requesting sounder 140. For example, if an operator of the marine vessel 110 wants to move from the pilot station 120 (FIG. 1) to the fly bridge 130 (FIG. 1), the operator first must turn or power off the sounder 140a at the pilot station 120 and then need only turn or power on the sounder 140b located at the fly bridge 130 to view graphical representation of the body of water. In further embodiments, the switch can determine the sounder requesting the signal without powering off the sounders 140.

Figure 2B:
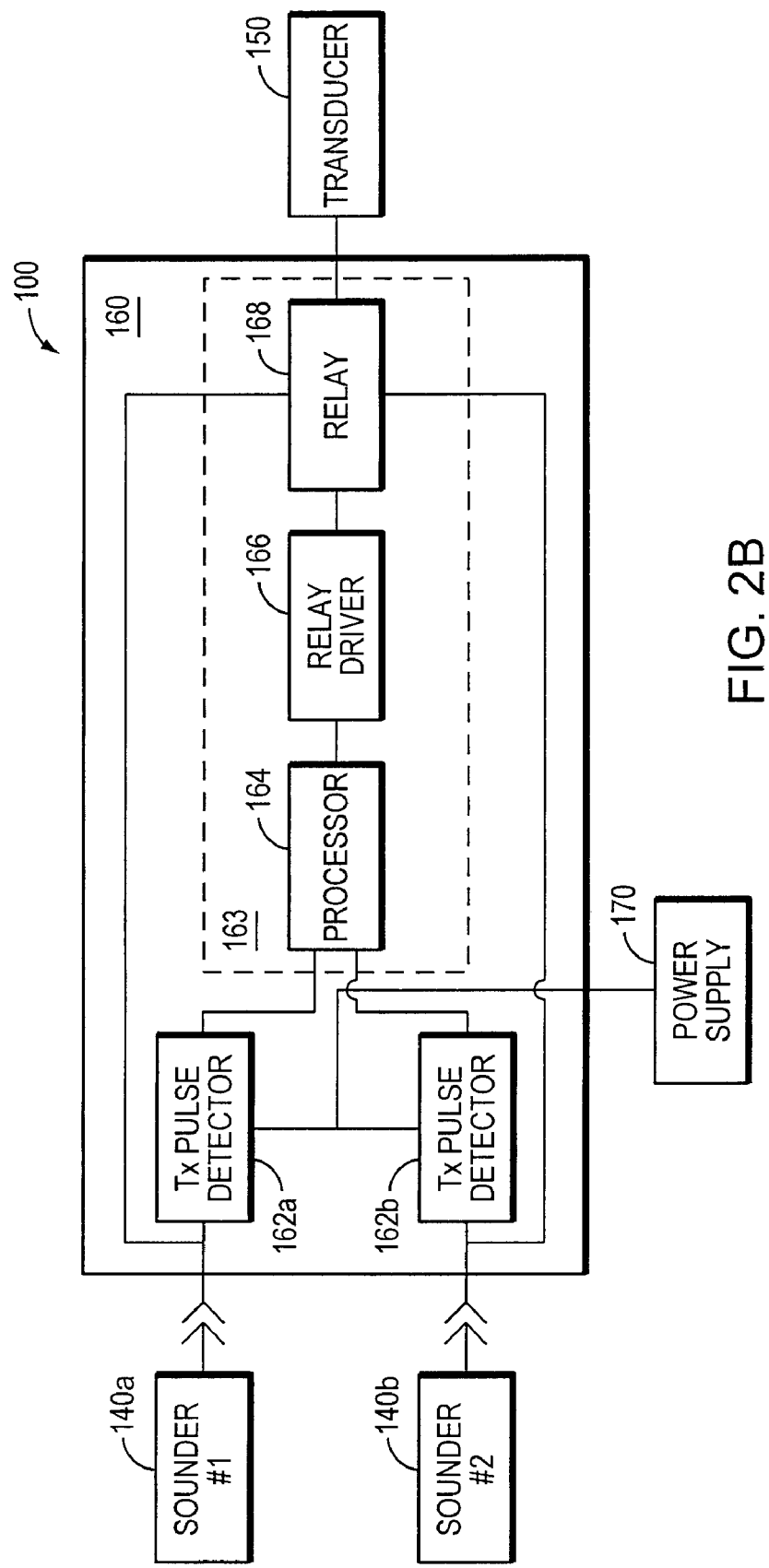
FIG. 2B shows a block diagram of the switching system of the FIG. 2A.

FIG. 2B shows a block diagram of the switching system of the FIG. 2A and particularly a more detailed block diagram of the switch 160. The switch 160 includes two pulse detectors 162a, 162b in communication with a respective sounder 140a, 140b. The pulse detector 162 monitors its respective sounder 140 to determine the sounder 140 that is requesting the signal produced from the transducer 150. Although two pulse detectors 162a, 162b are shown, it should be understood by one skilled on the art that multiple pulse detectors 162 can be used for multiple sounders 140. Each pulse detector 162 is in communication with a control circuit 163. The control circuit 163 includes a processor 164, a relay driver 166, and a relay 168. The processor 164 can be a simple digital logic circuit or any circuit that makes the decision to the switch. Upon detection from a requesting sounder 140, the processor 164 couples the signal produced by the transducer 150 to the requesting sounder 140 through a relay 168 by way of the relay driver 166. In optional embodiments, the switch 100 can include a power on/off switching circuit (180, FIG. 3A) for conditioning the signal produced by the transducer 150. A power supply 170 is coupled to the switch 160. The power supply 170 is typically a 12 VDC type power supply. The pulse detectors 162a, 162b produce a DC pulse which is the envelope of the sounder transmit pulse. The transmit pulse is preferably more than five milliseconds in duration and more than 50 volts peak-to-peak to obtain acceptable performance of the depth sounder/fishfinder 140.

Figure 3A:
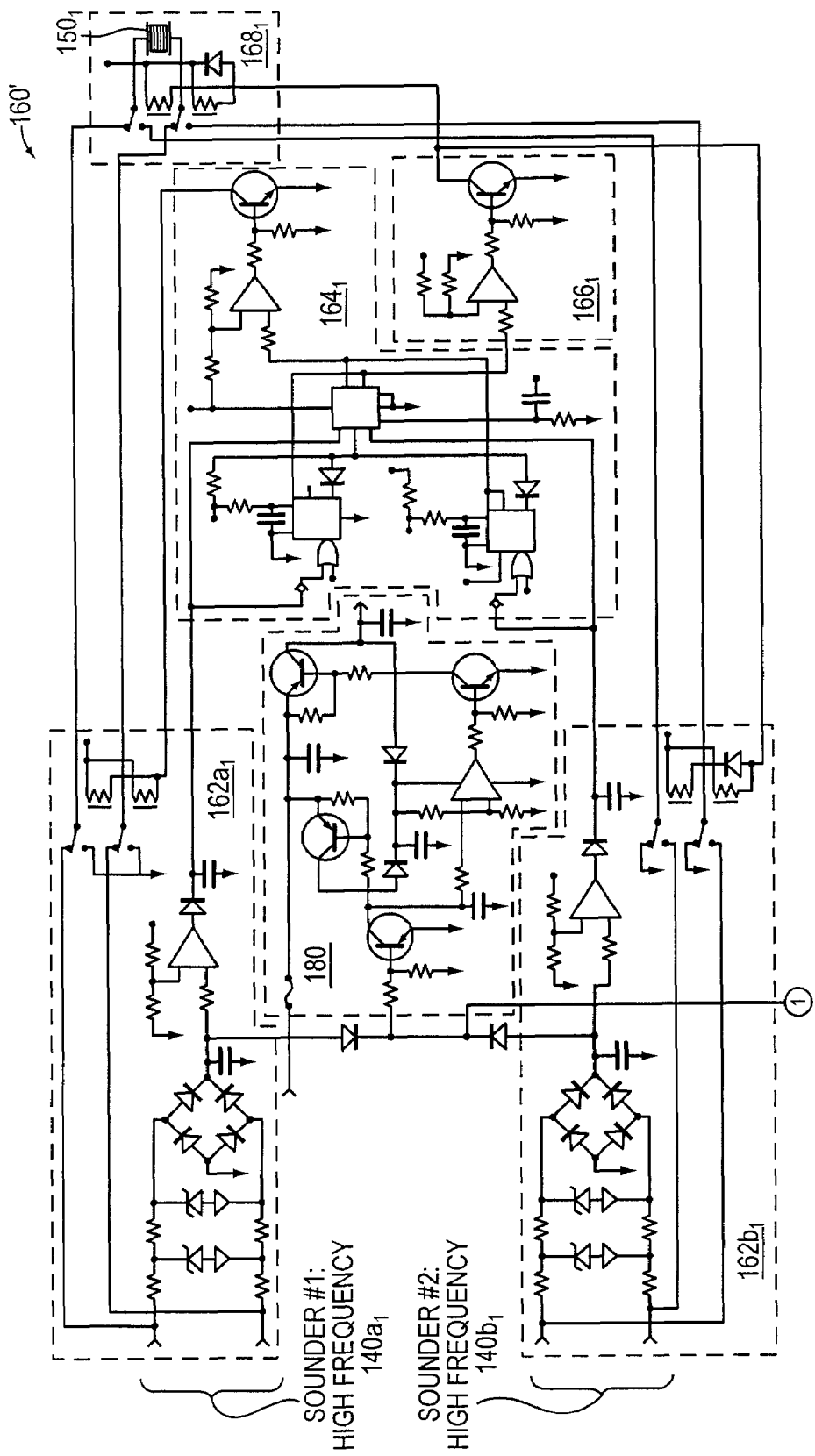
FIGS. 3A and 3B show a schematic diagram of a high side and low side, respectively, of a dual frequency switch of the present invention.
Figure 3B:
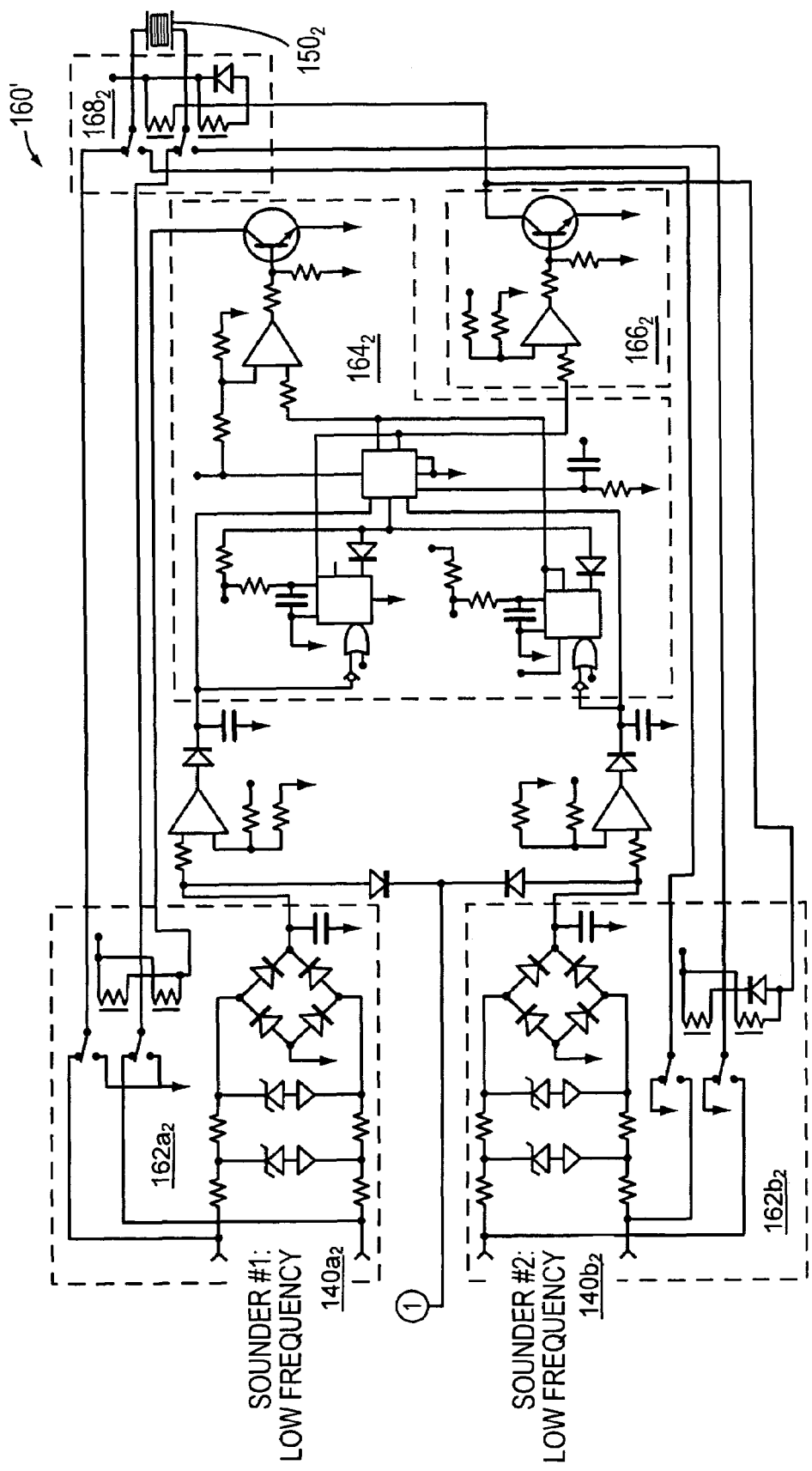

FIGS. 3A and 3B show a schematic diagram of an embodiment of a dual frequency switch 160' of the present invention. In some instances, sounders 140 are operable at dual frequencies and transducers 150 include dual frequency elements $150_1$, $150_2$. In these instances, the switch 160 (FIG. 2B) can be modified to include high frequency components denoted by the subscript 1 and low frequency components denoted by the subscript 2.

The high frequency side of the switch 160' will be described below with respect to FIG. 3A. It should be understood that the low frequency side of the switch 160' shown in FIG. 3B connects to the low frequency side of the respective sounders $140a_2$, $140b_2$ and transducer $150_2$.

The switch 160' includes two high frequency pulse detectors $162a_1$, $162b_1$ in communication with a high frequency side of respective sounders $140a_1$, $140b_1$. The pulse detector $162_1$ monitors its respective sounder $140_1$ to determine the sounder $140_1$ that is requesting the high frequency signal produced from the high frequency elements $150_1$ of the transducer 150. Although two pulse detectors $162a_1$, $162b_1$ are shown, it should be understood by one skilled on the art that multiple pulse detectors $162_1$ can be used for multiple sounders $140_1$. Each pulse detector $162_1$ is in communication with a control circuit. The control circuit includes a processor $164_1$, a relay driver $166_1$, and a relay $168_1$. Upon detection from a requesting sounder $140_1$, the processor $164_1$ couples the signal produced by the transducer $150_1$ to the requesting sounder $140_1$ though the relay $168_1$ by way of the relay driver $166_1$. Attenuating registers and peak clipping zener diodes may be included as part of the pulse detectors which help to provide signal isolation and limit the amplitude of sounder transmit pulses so as not to destroy the rectifier diodes that detect the envelope of the transmit pulses. Isolation between the two sounders may be achieved by grounding the PCB traces for the unused sounderbetween the relays.

While this invention has been particularly shown and described with references to preferred embodiments thereof, it will be understood by those skilled in the art that various changes in form and details may be made therein without departing from the scope of the invention encompassed by the appended claims.

What is claimed is:

1. A switch that couples a transducer signal transmitted from a transducer to one of plural sounders onboard a marine vessel, comprising:
   a detection circuit that detects an electrical signal from a particular sounder that is requesting the transducer signal; and
   a control circuit operable to switch the transducer to only one of the plural sounders, the control circuit switching the transducer signal to the requesting sounder responsive to the detection circuit.

2. The switch of claim 1, wherein the electrical signal is a pulse signal and the detection circuit comprises:
   a first pulse detector that detects a pulse from a first sounder; and
   a second pulse detector that detects a pulse from a second sounder.

3. The switch of claim 1, wherein the control circuit comprises:
   a processor in communication with the detection circuit that receives a detected pulse from the requesting sounder; and
   a relay circuit controlled by the processor to couple the transducer signal to the requesting sounder.

4. The switch of claim 1, further comprising:
   a second detection circuit that detects the sounder that is requesting a second transducer signal; and
   a second control circuit that couples the second transducer signal to the requesting sounder.

5. The switch of claim 4, wherein the first transducer signal is different from the second transducer signal.

6. A transducer signal switching system for a marine vessel, comprising:
   a transducer that produces a transducer signal representative of characteristics of a body of water;
   at least two sounders for producing a visual representation of the characteristics from the transducer signal; and
   a switch that switches the transducer signal to a selected one of the at least two sounders.

7. The transducer signal switching system of claim 6, wherein the transducer is an ultrasonic transducer.

8. The transducer signal switching system of claim 6, wherein the transducer is through-hull mounted to the marine vessel.

9. The transducer signal switching system of claim 6, wherein the transducer is transom mounted to the marine vessel.

10. The transducer signal switching system of claim 6, wherein a first sounder is located at a main pilot station of the marine vessel and a second sounder is located at a different station of the marine vessel.

11. The transducer signal switching system of claim 6, wherein the switch comprises:
    a detection circuit that detects an electrical signal from the sounder that is requesting the transducer signal; and
    a control circuit that couples the transducer signal to the requesting sounder.

12. The transducer signal switching system of claim 11, wherein the switch further comprises:
    a second detection circuit that detects the sounder that is requesting a second transducer signal; and
    a second control circuit that couples the second transducer signal to the requesting sounder.

13. The transducer signal switching system of claim 11, wherein the detection circuit comprises:
- a first pulse detector that detects a pulse from the first sounder; and
- a second pulse detector that detects a pulse from the second sounder.

14. The transducer signal switching system of claim 11, wherein the control circuit comprises:
- a processor circuit in communication with the detection circuit that receives a detected pulse from the requesting sounder; and
- a relay circuit that couples the transducer signal to the requesting sounder in response to the processor circuit.

15. An automatic switch for switching a transducer signal transmitted by a transducer between plural sounders onboard a marine vessel, comprising:
- means for detecting a particular sounder that requests the transducer signal; and
- means for switching the transducer signal to only the requesting sounder.

* * * * *